(12) United States Patent
Flockhart et al.

(10) Patent No.: US 8,234,141 B1
(45) Date of Patent: Jul. 31, 2012

(54) DYNAMIC WORK ASSIGNMENT STRATEGIES BASED ON MULTIPLE ASPECTS OF AGENT PROFICIENCY

(75) Inventors: Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1791 days.

(21) Appl. No.: 11/064,367

(22) Filed: Feb. 22, 2005

Related U.S. Application Data

(60) Provisional application No. 60/613,994, filed on Sep. 27, 2004.

(51) Int. Cl.
*G06Q 10/00* (2012.01)
(52) U.S. Cl. .................................................. 705/7.13
(58) Field of Classification Search .............. 705/9, 7.13
See application file for complete search history.

(56) References Cited

U.S. PATENT DOCUMENTS

| | | | |
|---|---|---|---|
| 4,163,124 A | 7/1979 | Jolissaint | |
| 4,389,400 A | 6/1983 | Ho | |
| 4,510,351 A | 4/1985 | Costello et al. | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,981 A | 11/1992 | Mitchell et al. | |
| 5,164,983 A | 11/1992 | Brown et al. | |
| 5,167,010 A | 11/1992 | Elm et al. | |
| 5,185,780 A | 2/1993 | Leggett | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,289,368 A | 2/1994 | Jordan et al. | |
| 5,291,550 A | 3/1994 | Levy et al. | |
| 5,299,260 A | 3/1994 | Shaio | |
| 5,309,513 A | 5/1994 | Rose | |

(Continued)

FOREIGN PATENT DOCUMENTS

CA 2143198 1/1995

(Continued)

OTHER PUBLICATIONS

Rodney B. Wallace & Ward Whitt, "A Staffing Algorithm for Call Center with Skill-Based Routing," Aug. 20, 2004.*

(Continued)

*Primary Examiner* — Jonathan G Sterrett
*Assistant Examiner* — Neil Kardos
(74) *Attorney, Agent, or Firm* — Sheridan Ross P.C.

(57) ABSTRACT

A contact center 100 having a plurality of performance goals is provided. The contact center includes a routing agent 232 operable, when a work item is to be routed to a servicing destination 134, 138 or 208, determine, for each performance goal, a status of goal realization 304 or 504 and a corresponding set of selection criteria 308 or 508 for the determined statuses of goal realization and a destination selector 216 or 220 operable to select the servicing destination based, at least in part, on the set of selection criteria.

16 Claims, 7 Drawing Sheets

U.S. PATENT DOCUMENTS

| | | |
|---|---|---|
| 5,325,292 A | 6/1994 | Crockett |
| 5,335,268 A | 8/1994 | Kelly, Jr. et al. |
| 5,335,269 A | 8/1994 | Steinlicht |
| 5,355,269 A | 10/1994 | Clausen |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A * | 6/1996 | Charalambous et al. 379/266.08 |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,590,188 A * | 12/1996 | Crockett ............ 379/265.02 |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 579,065 A | 8/1998 | Dunn et al. |
| 5,790,642 A | 8/1998 | Taylor et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,901,214 A | 5/1999 | Shaffer et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,941,983 A | 8/1999 | Gupta et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,058,179 A | 5/2000 | Shaffer et al. |
| 6,064,730 A | 5/2000 | Ginsberg |
| 6,064,731 A | 5/2000 | Flockhart et al. |
| 6,084,954 A | 7/2000 | Harless et al. |
| 6,097,885 A | 8/2000 | Rayner |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A * | 12/2000 | Bogart et al. ............ 379/266.01 |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 * | 8/2001 | Mullen ...................... 709/226 |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,363,411 B1 | 3/2002 | Dugan et al. |

| Patent | Date | Inventor |
|---|---|---|
| 6,366,666 B2 | 4/2002 | Bengtson et al. |
| 6,366,668 B1 | 4/2002 | Borst et al. |
| 6,373,836 B1 | 4/2002 | Deryugin et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,487,290 B1 | 11/2002 | Le Grand |
| 6,490,350 B2 | 12/2002 | McDuff et al. |
| 6,519,570 B1 | 2/2003 | Faber et al. |
| 6,535,600 B1 | 3/2003 | Fisher et al. |
| 6,535,601 B1 | 3/2003 | Flockhart et al. |
| 6,546,087 B2 | 4/2003 | Shaffer et al. |
| 6,553,114 B1 | 4/2003 | Fisher et al. |
| 6,556,974 B1 | 4/2003 | D'Alessandro |
| 6,560,329 B1 | 5/2003 | Draginich et al. |
| 6,560,330 B2 | 5/2003 | Gabriel |
| 6,560,649 B1 * | 5/2003 | Mullen et al. ................. 709/226 |
| 6,560,707 B2 | 5/2003 | Curtis et al. |
| 6,563,920 B1 | 5/2003 | Flockhart et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,584,191 B1 | 6/2003 | McPartlan et al. |
| 6,587,831 B1 | 7/2003 | O'Brien |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,636,598 B1 | 10/2003 | Thomson et al. |
| 6,639,982 B1 * | 10/2003 | Stuart et al. ............... 379/266.03 |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,687,257 B1 | 2/2004 | Balasubramanian |
| 6,700,967 B2 | 3/2004 | Kleinoder et al. |
| 6,704,409 B1 | 3/2004 | Dilip et al. |
| 6,711,253 B1 | 3/2004 | Prabhaker |
| 6,711,255 B2 * | 3/2004 | Berrondo et al. ......... 379/266.06 |
| 6,714,643 B1 | 3/2004 | Gargeya et al. |
| 6,718,330 B1 | 4/2004 | Zenner |
| 6,724,884 B2 * | 4/2004 | Jensen et al. ............. 379/265.01 |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,748,414 B1 | 6/2004 | Bournas |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,772,202 B2 | 8/2004 | Wright |
| 6,775,377 B2 | 8/2004 | McIllwaine et al. |
| 6,785,666 B1 | 8/2004 | Nareddy et al. |
| 6,801,520 B2 | 10/2004 | Philonenko |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,850,613 B2 | 2/2005 | McPartlan et al. |
| 6,859,529 B2 | 2/2005 | Duncan et al. |
| 6,898,190 B2 | 5/2005 | Shtivelman et al. |
| 6,915,305 B2 | 7/2005 | Subramanian et al. |
| 6,937,993 B1 | 8/2005 | Gabbita et al. |
| 6,947,543 B2 | 9/2005 | Alvarado et al. |
| 6,947,988 B1 | 9/2005 | Saleh |
| 6,968,052 B2 | 11/2005 | Wullert, II |
| 6,968,509 B1 | 11/2005 | Chang et al. |
| 6,970,554 B1 | 11/2005 | Peterson et al. |
| 6,970,829 B1 | 11/2005 | Leamon |
| 6,981,061 B1 | 12/2005 | Sakakura |
| 6,985,901 B1 | 1/2006 | Sachse et al. |
| 6,988,126 B1 | 1/2006 | Wilcock et al. |
| 7,010,542 B2 | 3/2006 | Trappen et al. |
| 7,013,344 B2 | 3/2006 | Megiddo |
| 7,020,254 B2 | 3/2006 | Phillips |
| 7,023,979 B1 | 4/2006 | Wu et al. |
| 7,035,808 B1 | 4/2006 | Ford |
| 7,035,927 B2 | 4/2006 | Flockhart et al. |
| 7,039,176 B2 | 5/2006 | Borodow et al. |
| 7,043,007 B2 | 5/2006 | McPartlan et al. |
| 7,047,192 B2 | 5/2006 | Poirier |
| 7,050,566 B2 | 5/2006 | Becerra et al. |
| 7,062,031 B2 | 6/2006 | Becerra et al. |
| 7,068,775 B1 | 6/2006 | Lee |
| 7,072,966 B1 | 7/2006 | Benjamin et al. |
| 7,076,051 B2 | 7/2006 | Brown et al. |
| 7,085,367 B1 | 8/2006 | Lang |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,133,520 B1 * | 11/2006 | Doyle et al. ............. 379/265.01 |
| 7,136,873 B2 | 11/2006 | Smith et al. |
| 7,142,666 B1 | 11/2006 | Bates et al. |
| 7,149,733 B2 | 12/2006 | Lin et al. |
| 7,155,612 B2 | 12/2006 | Licis |
| 7,158,628 B2 * | 1/2007 | McConnell et al. ...... 379/265.02 |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 * | 4/2007 | Edwards et al. ......... 379/265.01 |
| 7,203,655 B2 | 4/2007 | Herbert et al. |
| 7,212,625 B1 | 5/2007 | McKenna et al. |
| 7,215,744 B2 | 5/2007 | Scherer |
| 7,246,371 B2 | 7/2007 | Diacakis et al. |
| 7,254,641 B2 | 8/2007 | Broughton et al. |
| 7,257,597 B1 | 8/2007 | Pryce et al. |
| 7,266,508 B1 | 9/2007 | Owen et al. |
| 7,269,253 B1 | 9/2007 | Wu et al. |
| 7,272,223 B2 | 9/2007 | McCormack et al. |
| 7,283,805 B2 | 10/2007 | Agrawal |
| 729,566 A1 | 11/2007 | Denton et al. |
| 7,299,259 B2 | 11/2007 | Petrovykh |
| 7,346,532 B2 | 3/2008 | Kusama et al. |
| 7,372,857 B1 | 5/2008 | Kappler et al. |
| 7,372,952 B1 | 5/2008 | Wu et al. |
| 7,373,309 B2 | 5/2008 | Nishikawa et al. |
| 7,376,127 B2 | 5/2008 | Hepworth et al. |
| 7,382,773 B2 | 6/2008 | Schoeneberger et al. |
| 7,392,402 B2 | 6/2008 | Suzuki |
| 7,406,098 B2 | 7/2008 | Taneja et al. |
| 7,409,423 B2 | 8/2008 | Horvitz et al. |
| 7,418,093 B2 | 8/2008 | Knott et al. |
| 7,418,094 B2 | 8/2008 | Golitsin et al. |
| 7,478,051 B2 | 1/2009 | Nourbakhsh et al. |
| 7,526,440 B2 | 4/2009 | Walker et al. |
| 7,545,925 B2 | 6/2009 | Williams |
| 7,551,602 B2 | 6/2009 | Whitman, Jr. |
| 7,567,653 B1 | 7/2009 | Michaelis |
| 7,734,032 B2 | 6/2010 | Kiefhaber et al. |
| 2001/0011228 A1 | 8/2001 | Shenkman |
| 2001/0040887 A1 | 11/2001 | Shtivelman et al. |
| 2001/0056349 A1 | 12/2001 | St. John |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0012186 A1 | 1/2002 | Nakamura et al. |

| | | |
|---|---|---|
| 2002/0019829 A1 | 2/2002 | Shapiro |
| 2002/0021307 A1 | 2/2002 | Glenn et al. |
| 2002/0029213 A1 | 3/2002 | Borissov et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0194002 A1 | 12/2002 | Petrushin |
| 2003/0016812 A1* | 1/2003 | Rodenbusch et al. .... 379/266.05 |
| 2003/0026414 A1 | 2/2003 | Baker et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0095652 A1* | 5/2003 | Mengshoel et al. ..... 379/265.06 |
| 2003/0108186 A1 | 6/2003 | Brown et al. |
| 2003/0144900 A1 | 7/2003 | Whitmer |
| 2003/0144959 A1 | 7/2003 | Makita |
| 2003/0152212 A1 | 8/2003 | Burok et al. |
| 2003/0154184 A1 | 8/2003 | Chee et al. |
| 2003/0169870 A1 | 9/2003 | Stanford |
| 2003/0182310 A1 | 9/2003 | Charnock et al. |
| 2003/0231647 A1 | 12/2003 | Petrovykh |
| 2003/0231757 A1 | 12/2003 | Harkreader et al. |
| 2004/0008828 A1 | 1/2004 | Coles et al. |
| 2004/0010437 A1 | 1/2004 | Kiran et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0221285 A1 | 11/2004 | Donovan et al. |
| 2004/0230675 A1 | 11/2004 | Freimuth et al. |
| 2004/0260706 A1 | 12/2004 | Anonsen et al. |
| 2005/0004828 A1 | 1/2005 | deSilva et al. |
| 2005/0013428 A1 | 1/2005 | Walters |
| 2005/0021529 A1 | 1/2005 | Hodson et al. |
| 2005/0041580 A1 | 2/2005 | Petrovykh |
| 2005/0044375 A1 | 2/2005 | Paatero et al. |
| 2005/0065837 A1 | 3/2005 | Kosiba et al. |
| 2005/0071844 A1 | 3/2005 | Flockhart et al. |
| 2005/0091071 A1 | 4/2005 | Lee |
| 2005/0125276 A1 | 6/2005 | Rusu |
| 2005/0125432 A1 | 6/2005 | Lin et al. |
| 2005/0125458 A1 | 6/2005 | Sutherland et al. |
| 2005/0129212 A1 | 6/2005 | Parker |
| 2005/0135593 A1 | 6/2005 | Becerra et al. |
| 2005/0135600 A1 | 6/2005 | Whitman |
| 2005/0135601 A1 | 6/2005 | Whitman |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0045255 A1 | 3/2006 | Peters et al. |
| 2006/0056598 A1 | 3/2006 | Brandt et al. |
| 2006/0135058 A1 | 6/2006 | Karabinis |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2007/0038232 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0214456 A1 | 9/2007 | Casey et al. |
| 2007/0230681 A1 | 10/2007 | Boyer et al. |
| 2008/0056165 A1 | 3/2008 | Petrovykh |
| 2008/0275751 A1 | 11/2008 | Flockhart et al. |
| 2008/0275752 A1 | 11/2008 | Flockhart et al. |
| 2008/0275766 A1 | 11/2008 | Flockhart et al. |
| 2009/0193050 A1 | 7/2009 | Olson |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 9/1998 |
| EP | 0 863 651 A2 | 9/1998 |
| EP | 0 866 407 A1 | 9/1998 |
| EP | 0 899 673 A2 | 3/1999 |
| EP | 0 998 108 A1 | 5/2000 |
| EP | 1035718 | 9/2000 |
| EP | 1075130 | 2/2001 |
| EP | 1 091 307 A2 | 4/2001 |
| EP | 1 150 236 A2 | 10/2001 |
| EP | 1246097 | 10/2002 |
| GB | 2 273 418 | 6/1994 |
| GB | 2 290 192 A | 12/1995 |
| JP | 06-019861 | 1/1994 |
| JP | H7-005907 | 1/1995 |
| JP | 2001-053843 | 2/2001 |
| JP | 2002-051149 | 2/2002 |
| JP | 2002-297900 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 01/80540 A1 | 10/2001 |
| WO | WO 02/099640 | 12/2002 |

OTHER PUBLICATIONS

Rabun, Andy and Jim Sommers. "Microsoft Project 98 Support Course", Microsoft Corporation. Jun. 1998, 879 pages.
"Microsoft Project 2000 Training Manual", Microsoft Corporation. 2000, 431 pages.
Background of the Invention of the above-captioned application (previously provided).
U.S. Appl. No. 09/247,893, filed Feb. 10, 1999, Edwards et al.
U.S. Appl. No. 10/891,346, filed Jul. 13, 2004, Flockhart et al.
U.S. Appl. No. 10/673,115, filed Sep. 26, 2003, Flockhart et al.
U.S. Appl. No. 10/673,103, filed Sep. 26, 2003, Flockhart et al.
U.S. Appl. No. 10/673,105, filed Sep. 26, 2003, Flockhart et al.
U.S. Appl. No. 10/683,039, filed Oct. 10, 2003, Flockhart, et al.
U.S. Appl. No. 10/815,534, filed Mar. 31, 2004, Kiefhaber et al.
U.S. Appl. No. 10/815,584, filed Mar. 31, 2004, Kiefhaber et al.
U.S. Appl. No. 10/815,566, filed Mar. 31, 2004, Kiefhaber et al.
U.S. Appl. No. 10/861,193, filed Jun. 3, 2004, Kiefhaber et al.
Judge et al., Agent-enhanced workflow, BT Technologies Journal, vol. 16 No. 3, 1998.
Eder, Johann et al. "Time Management in Workflow Systems." BIS'99 3rd International Conference on Business Information Systems (1999).
Evenson et al., Effective Call Center Management: Evidence from Financial Services, The Wharton Financial Institutions Center, Jan. 1999.
U.S. Appl. No. 12/022,850, filed Jan. 30, 2008, Flockhart et al.
Morris et al., Sardine: Dynamic Seller Strategies in an Auction Marketplace, EC'OO, ACM, Oct. 17-20, 2000, p. 128-134.
Spraetz, Out with the new, in with the old: A look at scheduling alternatives, Customer Inter©ction Solutions; Nov. 2001: 20,5.
www.ElX.com (1998-2002) (http://web.archive.org/web/20020803000353/http://www.iex.com): Totalview The Workforce Management Solution, TotalView Product Literature: The Perfect Fit.

www.EIX.com (1998-2002) (http://web.archive.org/web/20020803000353/http://www.iex.com): Totalview The Workforce Management Solution, TotalView Product Literature: TotalView's Agent Webstation.

Business Editors, Microdyne Outsourcing Rolls Out RightForce Workforce Management to Manage Bi-Coastal Contact Center and E-Services Staff Business Wire. New York: Dec. 4, 2001. p. 1.

Business Editors, High Tech Editors. IEX Enhances Award-Winning Workforce Management Solution Business Wire. New York: Jul. 31, 2001. p. 1.

Microsoft Corporation. "User's Guide: Microsoft Project: Business Project Planning System Version 4.1 for Windows 95 or Version 4.0 for Windows 3.1." 1995. pp. 1-40 (Chapters 1-4).

U.S. Appl. No. 12/571,031, filed Sep. 30, 2009, Flockhart et al.

U.S. Appl. No. 10/946,638, Flockhart et al.

U.S. Appl. No. 11/069,739, Flockhart et al.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CaliRouter" Optimizing the Interaction Between Customers and Answering Resources. 6 pages.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Avaya, Inc., "Better Implementation of IP in Large Networks," Avaya, Inc. 2002, 14 pages.

Avaya, Inc., "Voice Over IP Via Virtual Private Networks: An Overview," Avaya, Inc., Feb. 2001.

Avaya, Inc., Business Advocate Options, available at http://www.avaya.com, downloaded on Feb. 15, 2003, Avaya, Inc., 2003.

Avaya, Inc., Business Advocate Product Summary, available at http://www.avaya.com, downloaded on Feb. 15, 2003, Avaya, Inc. 2003.

Avaya, Inc., CentreVu Advocate, Release 9, User Guide, Dec. 2000.

BellSouth "Frequently Asked Questions: Domain Name Service FAQs" (printed Mar. 31, 2003, at https://registration.bellsouth.net/NASApp/DNSWebU1/FAQ.jsp, 4 pages.

"Chapter 9: Domain Name Services" (printed Mar. 31, 2003, at http://www.pism.com/chapt09/chapt09.html, 21 pages.

"eGain's Commerce 2000 Platform Sets New Standard for eCommerce Customer Communications," Business Wire (Nov. 15, 1999).

"Internet Protocol Addressing" (printed Mar. 31, 2003), at http://www.samspade.org/d/ipdns.html, 9 pages.

"The Advantages of Load Balancing in the Multi-Call Center Enterprise," Communication Without Boundaries, Avaya White Paper (Feb. 2002), pp. 1-13.

"When Talk Isn't Cheap," Sm@rt Reseller, v. 3, n. 13 (Apr. 3, 2000), p. 50.

Chavez, David, et al., "Avaya MultiVantage Software: Adapting Proven Call Processing for the Transition to Converged IP Networks," Avaya, Inc., Aug. 2002.

Doo-Hyun Kim et al. "Collaborative Multimedia Middleware Architecture and Advanced Internet Call Center," Proceedings at the International Conference on Information Networking (Jan. 31, 2001), pp. 246-250.

Douglas W. Stevenson, et al.; "Name Resolution in Network and Systems Management Environments" (printed Mar. 31, 2003), at http://netman.cit.buffalo.edu/Doc/Dstevenson/NR-NMSE.html, 16 pages.

E. Noth at al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 8 pages.

Foster, Robin, et al., "Avaya Business Advocate and its Relationship to Multi-Site Load Balancing Applications," Avaya, Inc., Mar. 2002.

John H.L. Hansen et al., "Foreign Accent Classification Using Source Generator Based Prosodic Features," Robust Speech Processing Laboratory, Duke University Department of Electrical Engineering, (undated), pp. 1-4.

L.F. Laurel and J.L. Gauvain, "Language Identification Using Phone-Based Acoustic Likelihoods," ICASSP-94, 4 pages.

Levent M. Arslan et al,, "Language Accent Classification in American English," Robust Speech Processing Laboratory, Duke University Department of Electrical Engineering, Technical Report RSPL-96-7, revised Jan. 29, 1996, pp. 1-16.

Levent M. Arslan, "Foreign Accent Classification in American English," Dissertation submitted to Department of Electrical Computer Engineering, Graduate School of Duke University, (1996), pp. 1-201.

MIT Project Oxygen, "Pervasive, Human-Centered Computing—Oxygen," MIT Laboratory for Computer Science, (Jun. 2000), pp. 1-15.

Presentation by Victor Zue, "The MIT Oxygen Project," MIT Laboratory for Computer Science, Cambridge, MA (Apr. 25-26, 2000), 9 pages.

Sarah Ahmed; "A Scalable Byzantine Fault Tolerant Secure Domain Name System," Thesis submitted to Department of Electrical Engineering and Computer Science, Massachusetts Institute of Technology (Jan. 22, 2001), pp. 1-101.

Scott Coles; "A Guide for Ensuring Service Quality in IP Voice Networks," Communication Without Boundaries, Avaya White Paper (Jun. 2002), pp. 1-17.

Dinda, Peter A., "A Prediction-based Real-time Scheduling Advisor", 2002, pp. 1-8.

US 6537685, 07/2003, Fisher et al. (withdrawn).

U.S. Appl. No. 11/199,828, filed Aug. 8, 2005, Bland et al.

U.S. Appl. No. 11/242,687, filed Oct. 3, 2005, Krimstock et al.

U.S. Appl. No. 11/245,724, filed Oct. 6, 2005, Flockhart et al.

U.S. Appl. No. 11/517,646, filed Sep. 7, 2006, Hackbarth et al.

U.S. Appl. No. 11/536,456, filed Sep. 28, 2006, Hackbarth et al.

U.S. Appl. No. 11/861,857, filed Sep. 26, 2007, Tendick et al.

U.S. Appl. No. 12/242,916, filed Oct. 1, 2008, Kiefhaber et al.

"Avaya IQ—Building Upon the Strengths of CMS", White Paper, Feb. 2007, 11 pages.

"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.

"Driving Model Agent Behaviors With Avaya IQ", White Paper, Apr. 2007, 12 pages.

"KANA —Contact Center Support", available at http://www.kana.com/solutions.php?tid=46, copyright 2006, 3 pages.

"Monitoring: OneSight Call Statistics Monitors", available at http://www.empirix.com/default.asp?action=article&ID=301, date unknown, printed May 10, 2007, 2 pages.

"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).

"Still Leaving It To Fate?: Optimizing Workforce Management", Durr, William Jr., Nov. 2001.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Avaya IQ "Introducing Reporting and Analytics As You Designed It", 2007, 4 pages.

Definity Communications System Generic 3 Call Vectoring/Expert Agent Selection (EAS) Guide, At&T publication No. 555-230-520 (Issue 3, Nov. 1993).

Nortel—"Centrex Internet Enabled Call Centers," http://www.products.nortel.com/go/product_assoc.jsp?segId=0&parID=0&catID=-9191&rend_id . . . (Copyright 1999-2005) (1page).

* cited by examiner

| | First Goal Status | Second Goal Status | ... | Nth Goal Status |
|---|---|---|---|---|
| First Agent Proficiency Aspect | Met | Met | ... | Met |
| Second Proficiency Agent Aspect | Met | Met | ... | Unmet |
| ... | ... | ... | ... | ... |
| Mth Proficiency Agent Aspect | Unmet | Unmet | ... | Unmet |

Fig. 3

| | First Goal Status | Second Goal Status | ... | Nth Goal Status |
|---|---|---|---|---|
| First Qualifier | Met | Met | ... | Met |
| Second Qualifier | Met | Met | ... | Unmet |
| ... | ... | ... | ... | ... |
| Mth Qualifier | Unmet | Unmet | ... | Unmet |

*Fig. 5*

DYNAMIC WORK ASSIGNMENT STRATEGIES BASED ON MULTIPLE ASPECTS OF AGENT PROFICIENCY

CROSS REFERENCE TO RELATED APPLICATION

This application claims the benefits under 35 U.S.C. §119 of U.S. Provisional Patent Application Ser. No. 60/613,994, filed Sep. 27, 2004, of the same title and to the same inventors, which is incorporated herein by this reference.

FIELD OF THE INVENTION

The present invention is directed generally to servicing a contactor in a contact center and specifically to allocating work items among contact center resources.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Agents with a higher skill are normally preferred over agents with lower skill levels when assigning an agent to a contact. When agents have multiple skills, the controller is more likely to select a contact for which the agent has a high skill level over a contact for which the agent has a lesser skill level. Generally, the only condition that results in a contact not being delivered to an available agent is that there are no contacts waiting to be handled.

Contact-distribution algorithms ultimately seek to maximize contact center performance and profitability. That may involve minimizing cost, maximizing contact throughput, and/or maximizing revenue, among others. Skills-based routing, which allows each agent to be slotted into a number of agent groups based on the agent's skill types and levels, is an attempt to maximize contact center performance and profitability. Skills-based routing systems have been further modified by introducing, as criterion in assigning work items to available agents, the service level associated with each work item. Service level refers to the proportion of work item transactions meeting specified objectives or goals. Service level is typically measured over some period of time or over some number of transactions. Examples of service levels are the percentage of customer problems resolved without further activity (one-and-done), the proportion of telephone calls handled by a qualified representative without requiring a transfer or referral to another agent, the proportion of telephone calls that can be connected to a server without delay, the proportion of email requests that are answered within 24 hours, the proportion of transactions handled not resulting in a customer complaint, the proportion of preferred customer calls handled by fully qualified agents, the percentage of Spanish customers handled by an agent fluent in Spanish, the percentage of telephone calls not abandoned by the customer before connection to an agent, the percentage of customer inquiry telephone calls that are not blocked at the central office switch, the percentage of customer sessions with the self-service World Wide Web pages that are not aborted while waiting for a display, the percentage of customer requests via telephone that can be completed immediately while on the phone, and the percentage of priority telephone calls answered within 8 seconds and handled properly by a qualified server, to name but a few.

A contact center's goal for a service level is a particular desired value of the service level. The goal is said to be satisfied or attained if the attained or measured service level is at least as high as the desired service level for the goal. Conversely, the goal is said to be not satisfied or unattained if the realized service level is less than the desired service level. For example, the goal of at least 85% of telephone calls from preferred customers each day being answered within 12 seconds would be attained if, among the telephone calls from preferred customers during the current day, 87% were answered within 12 seconds; inversely, if only 84% of such calls are answered within 12 seconds, the goal would be unattained.

In existing skills-based contact routing algorithms using service levels as part of the work item routing determination, the skill level is normally a simple integer assigned to each skill that the agent can perform and is a composite of all of the various and numerous aspects of agent proficiency or expertise. One example of such a contact routing algorithm is described in U.S. Pat. No. 6,173,053 ("the '053 patent"). The algorithm described in the '053 patent uses agent profiles to identify a best agent to service an incoming contact. Each agent has a service profile for each contact type or skill that they handle. As will be appreciated, a "contact type" is determined by segmentation using suitable criteria, such as language, intent, geography, channel, and the like. A service profile includes present values of a number of service metrics, such as agent proficiency, profitability, customer satisfaction, and agent satisfaction. When a contact of a particular type is available for servicing, the present values of the service metrics of the service profile of each agent who is available to handle the contact are combined into a score according to one of a number of formulas, which correspond to that contact type, and the agent with the best score is assigned to the contact. When the assigned agent finishes handling the contact, his or her performance is evaluated based on the service metrics, and the valuations are used to revise the present values of the service metrics of that agent's service profile. The revision process gives more weight to valuations of more-recently-handled contacts to reflect both long-term and short-term agent performance trends and variations.

These contact allocation algorithms can have drawbacks. By focusing solely on a composite score they ignore other aspects of agent proficiency. Such aspects include agent effectiveness, speed, efficiency, experience, cross-sell ability, and the like. They also fail to consider the interplay between contact center goals and aspects of agent proficiency. When different sets of goals are unmet in the contact center, it may advantageous to focus on different aspects of agent proficiency to address the unmet goal sets. By way of illustration, when there is limited work and a surplus of available agents the optimal strategy may be to focus on the agent aspect of effectiveness and assign what work there is to the most effective agents. When work queues are excessively long, the optimal strategy may be to focus on the agent aspect of speed and assign work to the fastest agents.

SUMMARY OF THE INVENTION

These and other needs are addressed by the various embodiments and configurations of the present invention. The present invention is directed generally to a resource allocation system and method that dynamically and automatically applies different work item destination routing algorithms under different contact center conditions.

In a first embodiment, a method for servicing work items in a contact center is provided. The contact center has a number (or set) of performance goals. Exemplary contact center objectives or goals include, in addition to the goal examples noted above, a maximum wait time in a work item queue, minimum agent staffing level in an agent queue, minimum revenue realized per serviced work item, a minimum customer satisfaction level, maximum time for an agent to a work item, a minimum number of contacts to be serviced by a set of agents during a selected time period, and/or a specified degree of compliance therewith. The steps of the method include:

(a) selecting a work item for routing to a servicing destination;

(b) determining, for each performance goal, a status of goal realization; and (c) selecting the servicing destination based, at least in part, on the statuses of the performance goals. Differing sets of goal statuses commonly result in differing sets of servicing destination selection criteria and/or different work item routing algorithms.

The work item can be any item of work for a contact center resource, such as a human or robotic agent. Typically, a work item is a contact, such as a voice call, an email, a facsimile, a voice message, an instant message, and Web chat.

The servicing destination can be a contact center resource, such as a human agent, an automated attendant, an Interactive Voice Recognition unit or IVR, and a class of service, such as a work item queue.

The status of goal realization can take many different forms. The status can be based on a simple binary system; that is, the goal is either attained or not attained based on the service level measured for the goal. The status can be based on meeting various selected service levels for a corresponding goal and/or levels of compliance with the goal. For example, the goal is satisfied for only Y % of contacts, is X % out of compliance, and the like. The status can be a combination of the foregoing.

When the servicing destination is an agent, the agent selection criterion is one or more aspects of agent proficiency. Exemplary aspects of agent proficiency include agent effectiveness, revenue generating proficiency, customer satisfaction level, speed, efficiency, experience, cross-sell ability, personal satisfaction, proficiency at closing the sale, and occupancy.

When the servicing destination is a class of service or work item queue, the selection criterion is typically one or more qualifiers.

In one configuration, a goal satisfaction table is maintained to facilitate determination of the appropriate selection criteria. The goal satisfaction table maps the differing sets of outcomes for the various goals against the desired selection criteria.

The present invention can have a number of advantages relative to the prior art. For example, the present invention does not use a composite score and thereby ignore other aspects of agent proficiency. It can dynamically consider the various agent proficiency aspects based on the conditions of the contact center to achieve the best results under the current conditions. By using different selection criteria or selection algorithms for different sets of goal statuses, the present invention can dynamically consider the complex interplay between, often conflicting, contact center goals, such as revenue generation and customer satisfaction. As will be appreciated, the priorities of the goals typically vary depending on the contact center state.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 3 is a goal satisfaction table mapping goal status against desired agent proficiency aspect for an embodiment of the present invention;

FIG. 5 is a goal satisfaction table mapping goal status against desired agent proficiency aspect for another embodiment of the present invention;

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
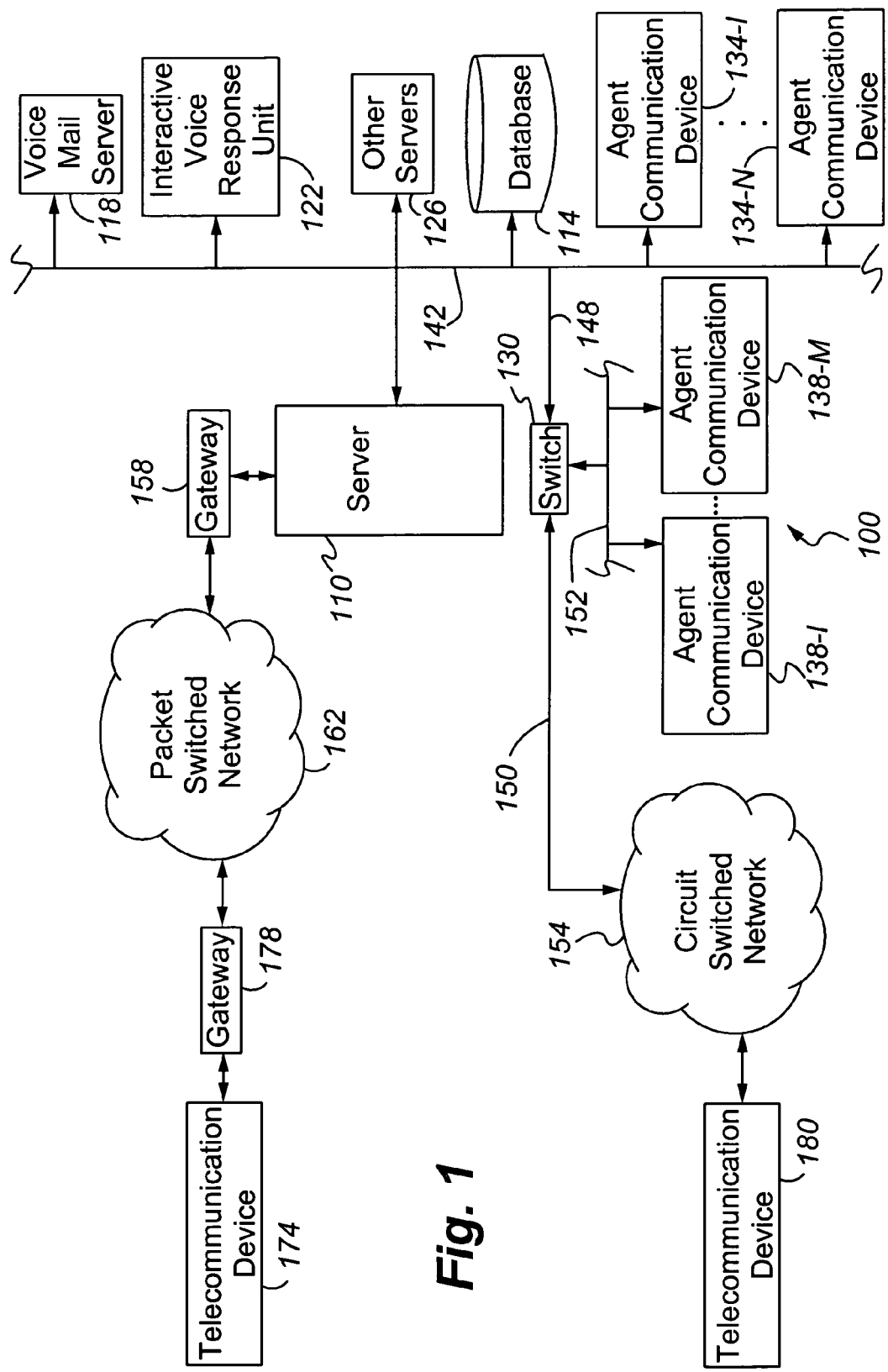
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Figure 2:
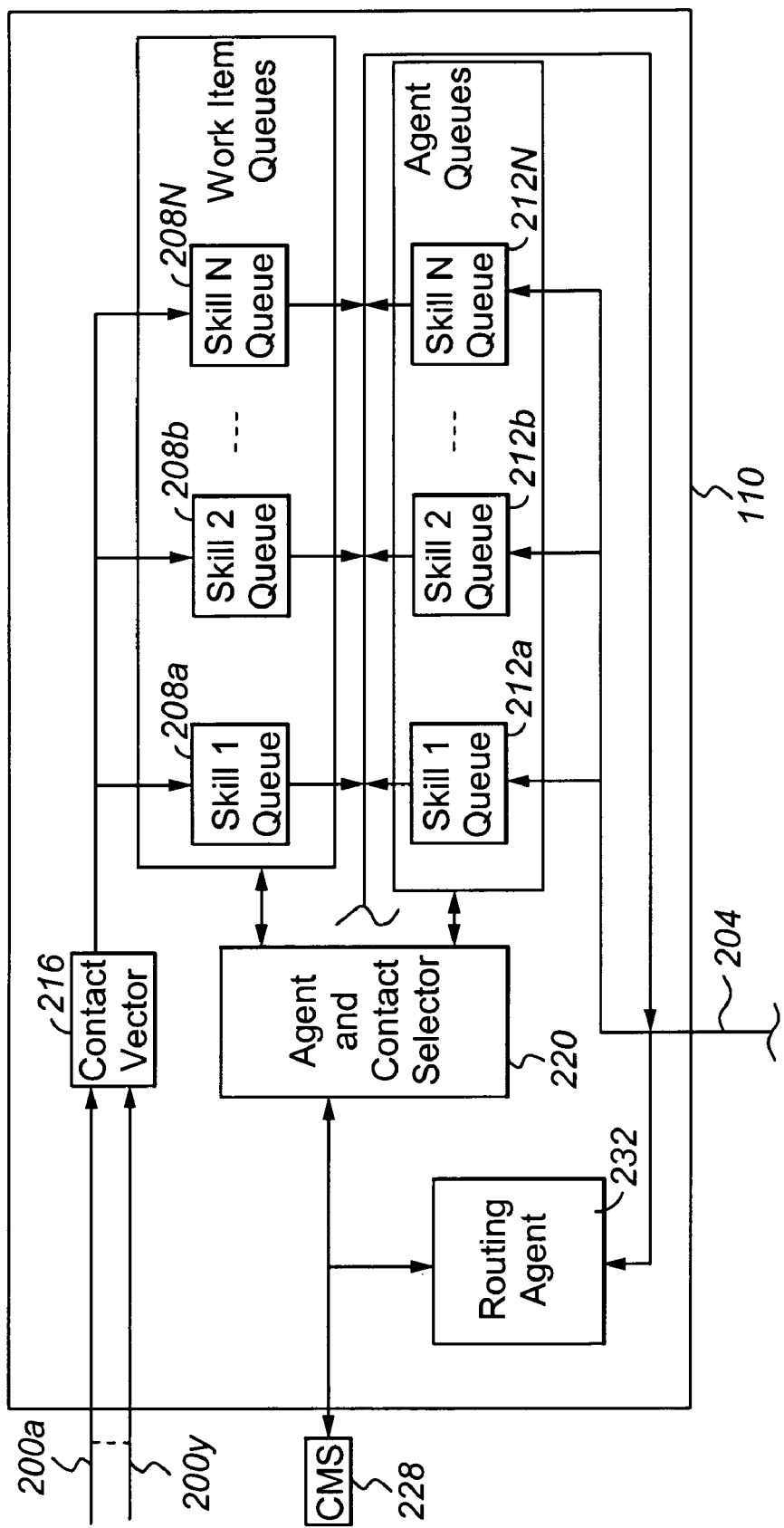
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include Avaya Inc.'s an Operational Analyst™ with On-Line Analytical Processing or OLAP technology or a Call Management System or CMS 228 that gathers contact records and contact-center statistics for use in generating contact-center reports. OA and CMS will hereinafter be referred to jointly as CMS 228.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™, IP600™ or S8700™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and either are enqueued in individual ones of the work item queues 208a-n in their order of priority or are enqueued in different ones of a plurality of work item queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a work item vector 216. Contacts incoming to the contact center are assigned by work item vector 216 to different work item queues 208a-n based upon a number of predetermined criteria, including customer identity, customer needs, contact center needs, current work item center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring, one type of work item routing, is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700™, G600™, or MCC/SCC™ media gateway and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact (or first work item) to an agent, the central server 110 also forwards customer-related information from databases 114 to the agent's computer work station for viewing (such as by a pop-up display) to permit the agent to better serve the customer. Depending on the contact center configuration, the central server may forward a list of work items to an available agent to preview before forwarding the contact itself and the data associated therewith to the agent. The agents process the contacts or work items sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the invention, included among the programs executing on the server 110 are an agent and work item selector 220 and routing agent 232. The selector 220 and routing agent 232 are stored either in the main memory or in a peripheral memory (e.g., disk, CD ROM, etc.) or some other computer-readable medium of the center 100. The selector 220 and agent 232 collectively effect an assignment between available contacts and available agents in a way that tends to maximize contact center efficiency for the current contact center state. The selector 220 uses predefined criteria in selecting an appropriate agent to service the contact. The routing agent 232 assists the work item vector 216 in routing the contacts to the appropriate queue 208 and/or the selector 220 in routing a contact to a most desirable agent in the queue 212. The routing agent 232, in particular, obtains, for each of a plurality of contact center goals or objectives, status information, or information respecting whether or not a corresponding goal is being met or unmet and/or a level to which the corresponding goal is being met or unmet. For example, exemplary goal levels can be expressed as actual, average or median wait times in each queue 208, actual, average, or median agent staffing levels in each queue 212, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, and number of contacts to be serviced by a set of designated agents during a selected time period. This information, along with other statistics is typically gathered by the CMS 228.

The agent and customer profiles are typically maintained and updated by a profile generator (not shown). Upon the completion of handling a contact, the generator collects selected metrics for the contact. These metrics include the skill involved in servicing the contact, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the contact, the rating of the customer of the agent's proficiency in handling the contact, the rating of another party, such as the agent's supervisor or another observer, of how the contact was serviced, whether the agent requested assistance, and whether the agent's training was completed, and stores the information in the database 114, such as CMS 228. The metrics over a selected period of time are typically stored under each agent's profile. Each agent profile typically includes metrics associated with a plurality of contacts serviced by the agent for each agent skill, and each customer profile includes metrics associated with a plurality of contacts by the customer.

The metrics typically relate to a broad variety of agent proficiency aspects, which can vary by agent skill type (or work item type) for multi-skilled agents. Exemplary proficiency aspects include agent effectiveness (e.g., X % of contacts serviced by agent have a favorable outcome for the customer and/or contact center), agent revenue generating proficiency (e.g., $Y generated by the agent per serviced contact), agent customer satisfaction level (e.g., Z % of contacts serviced by agent received a satisfactory customer satisfaction level rating), the agent speed (e.g., average contact service time for agent is W minutes/contact, U % of contacts are serviced within V minutes), agent efficiency (e.g., T % of contacts serviced by agent are one-and-done), experience (e.g., number of months/years agent has serviced contacts), ability to cross-sell (e.g., S % of contacts serviced by agent result in additional revenue due to cross-selling), personal agent satisfaction (e.g., the agent most prefers serving work items of skill X rather than work items of skill Y), and occupancy (e.g., select the agent who has worked less over a specified period to service a work item). Although only one exemplary metric has been provided for each proficiency aspect, it is to be understood that each aspect can be a composite of multiple different metrics. For example, the effectiveness of an agent can be a function of the percent of contacts having a successful outcome, the average value realized for each contact, and the average customer feedback score. Stated another way, it is possible for one proficiency aspect to be a function, at least in part, of another proficiency aspect.

The agent 232 dynamically and automatically provides the most relevant proficiency aspect (or metric) to the selector 220 as conditions change within the contact center. As used herein, a "condition" in a contact center is defined as the realization status of a goal and/or the level of satisfaction or dissatisfaction of a goal. In connection with this function, the contact center maintains one or more goal satisfaction tables mapping the goal status against the desired set of agent proficiency aspects to be employed in work item routing. As will be appreciated, many goals are inconsistent or conflicting, and the tables permit the agent 232 to select routing criteria and/or algorithm that addresses a particular goal or set of goals considered most important in view of the particular facts surrounding the performance of the contact center at the time of agent selection.

FIG. 3 is an example of goal satisfaction table 300. The horizontal axis 304 provides the status of a selected goal while the vertical axis 308 provides the suitable agent proficiency metric for a unique set of contact center conditions. For example, the first agent proficiency aspect is to be used in work item routing when each of the first, second, . . . Nth goals are met. The second agent proficiency aspect is to be used in work item routing when each of the first and second goals have been met but the Nth goal is unmet. The Mth agent proficiency aspect is to be used in work item routing when each of the first, second, . . . Nth goals are unmet. Stated more simply, when there is a shortage of work the agent 232 could select the available agent having the highest metric for agent effectiveness. When there is surplus of work the agent 232 could select the contact for servicing by the available agent that requires the agent skill having the highest metric for agent efficiency. Although the table 300 is depicted as being two-dimensional, one of ordinary skill in the art will readily appreciate that it can have more than two dimensions, depending on the application. As will be further appreciated, the table is not required to be binary. It can reflect the varying degrees to which a selected goal is being met or not being met (i.e., the first goal has a status of being only X % satisfied) and/or the trend or rate at which the goal is changing (i.e., the first or second mathematical derivative of the function describing the time variation in the goal). As will be further appreciated, not only can there be a different goal satisfaction table for a grouping of agents depending on the time-of-day or day-of-week (e.g., the agent queue 212a has a first goal satisfaction table for the business week and a second goal satisfaction table for the weekend to reflect changes in customer expectations/behavior) but also each agent queue 212, or enterprise department or business segment, can have a different goal satisfaction table (e.g., a sales department versus a service or customer help department).

The term "stored list" or "table" should be understood to include any ordered set of information or data stored in memory or other storage device accessible to the switch and/or server. The invention does not require that the information be stored in any particular length or format, e.g., a tabular format, a closed- or open-set, and numerous suitable storage formats will be readily apparent to those skilled in the art.

The selector 220 selects a suitable agent to service a work item at the head of a queue 208 based, at least in part, on the controlling agent proficiency aspect (or set of proficiency aspects) received from the agent 232. For example, when several agents are currently available or will be available within a selected period of time to service the work item the selector 220 selects the agent from among the group that has the highest metric score for the controlling agent proficiency aspect (or the highest metric scores for the set of proficiency aspects). In another example, when two work items are at the head of different queues 208 and an agent that is currently available or will be available within a selected period of time is in each of the two agent queues 212 servicing the respective work item queues 208 (or the agent is multi-skilled and is therefore in the two relevant agent queues 212), the work item routed to the agent is the work item that requires the agent proficiency aspect for which the agent has the highest metric or score.

Figure 4:
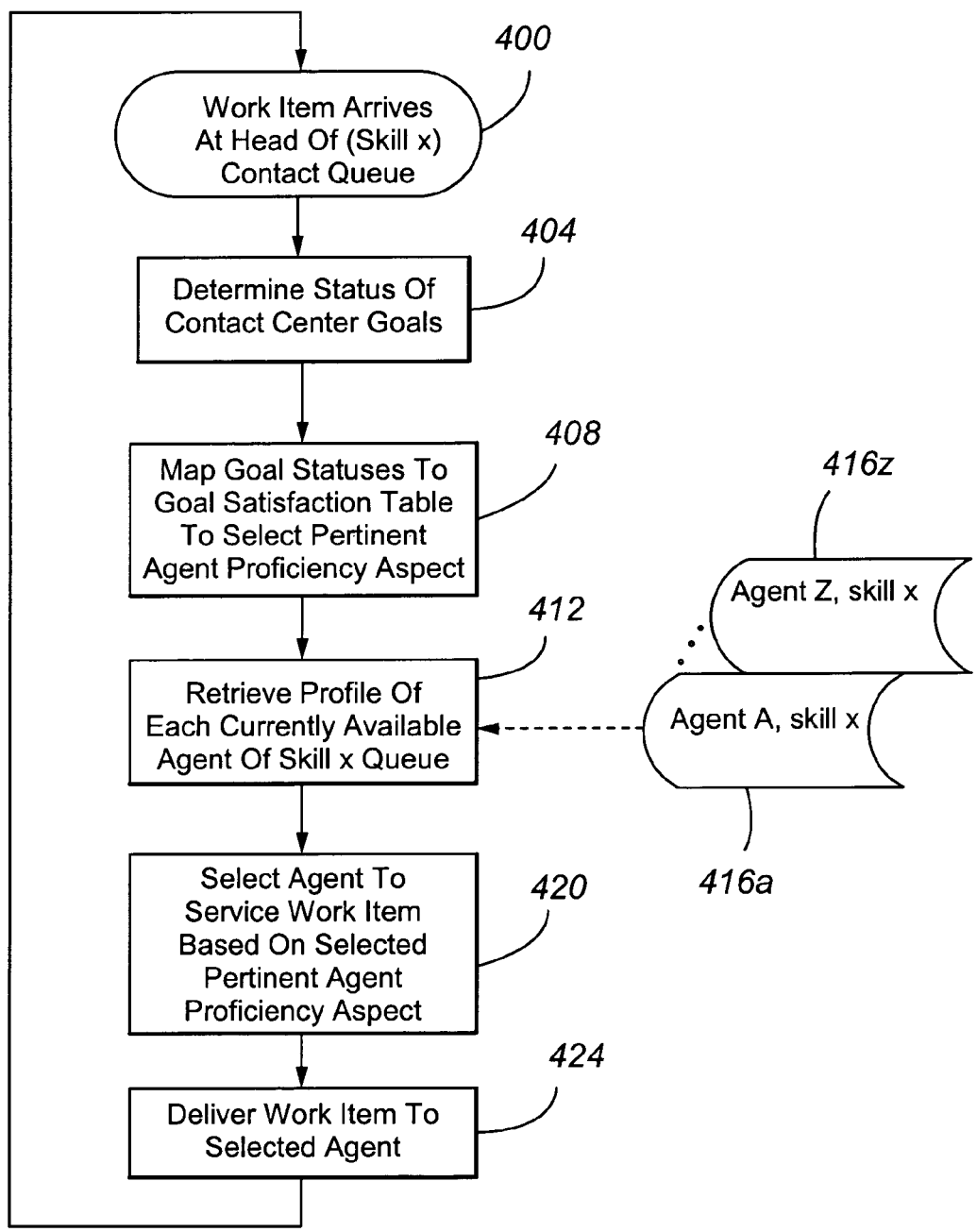
FIG. 4 is a flow chart depicting an operational embodiment of the routing agent according to an embodiment of the present invention.

The collective operation of the agent 232 and selector 220 will now be described with reference to FIG. 4.

In step 400, a contact arrives at the head of a work item queue 208 having skill X.

In step 404, the agent 232 determines the status of the various contact center goals. Typically, the agent 232 obtains this information from CMS 228.

In step 408, the agent 232 maps the statuses of the various goals to the goal satisfaction table 300 to select a pertinent controlling agent proficiency aspect or set of controlling agent proficiency aspects. "Mapping" refers broadly to include any technique for determining if a given set of contact center goal statuses has a corresponding entry on a stored list. The agent 232 then provides the set of aspects to the selector 220.

In step 412, the selector 220 retrieves the profile(s) 416 of each currently available agent in the skill X agent queue 212 servicing the skill X work item queue 208. The profile(s) are typically obtained from the database 114.

In step 420, the selector 220, based on the controlling set of aspects and each agent's respective scores on each of the aspects, selects the appropriate agent to service the work item.

In step 424, the selector 220 delivers the work item to the selected agent.

The agent 232 then returns to step 400 to repeat the foregoing steps for the next work item reaching the head of the skill X work item queue 208.

Another embodiment of the invention will now be discussed. In this embodiment, a multi-skilled agent becomes available to service one of a plurality of different types of available work items (each of which he is skilled to service), and the agent 232, based on the condition of the contact center, selects the appropriate skill of the plurality of agent skills to use in selecting the appropriate work item. Stated simply, the specific skill selection criteria depends on the current statuses, outcomes, and/or levels of realization of the various contact center goals.

Figure 8:
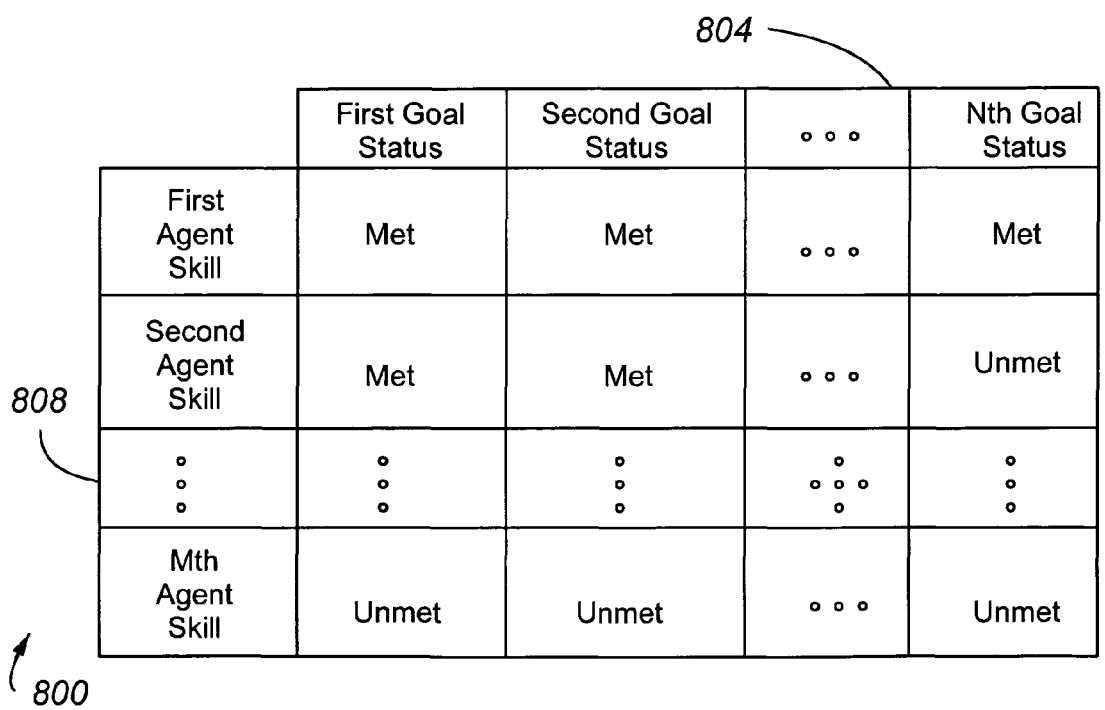
FIG. 8 is a goal satisfaction table mapping agent skill against goal status for an embodiment of the present invention.

FIG. 8 depicts a goal satisfaction table 800 for use by the agent 232 in this embodiment. The horizontal axis 804 maps the status of each goal against the agent skill on the vertical axis 808. In other words, when the first, second, . . . Nth goals are met the first agent skill is selected as the basis for selecting the appropriate work item from among the queued plurality of different types of work items. Of the queued plurality of work item types, the selected work item is generally the most consistent with the selected skill.

Figure 7:
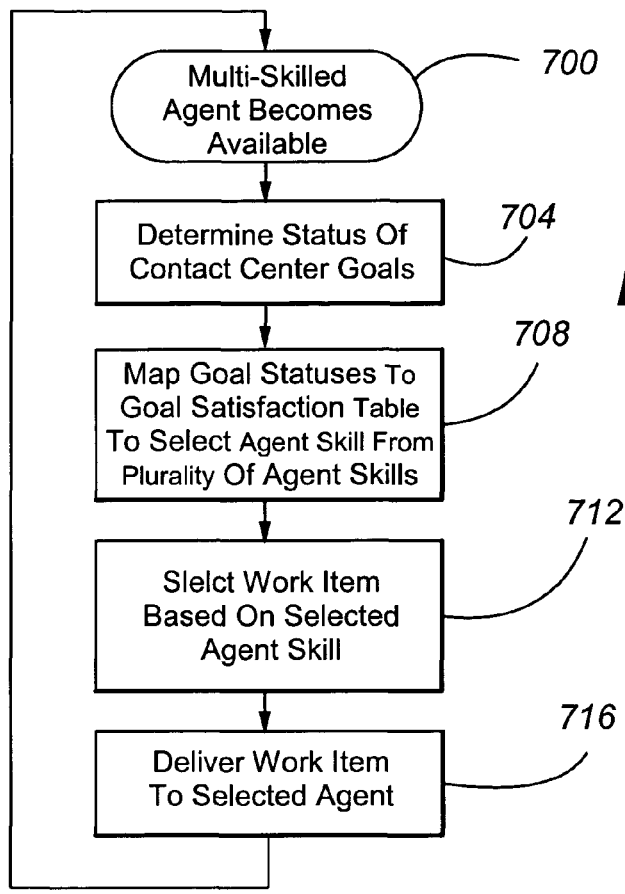
FIG. 7 is a flow chart depicting an operational embodiment of the routing agent and agent in contact selector according to an embodiment of the present invention.

The collective operation of the agent 232 and selector 220 will now be described with reference to FIG. 7.

In step 700, a multi-skilled agent becomes available for servicing a queued work item, and there are a plurality of queued work items, typically at the heads of different queues, that he or she is skilled to service.

In step 704, the agent 232 determines the status of the various contact center goals. Typically, the agent 232 obtains this information from CMS 228.

In step 708, the agent 232 maps the statuses of the various goals to the goal satisfaction table 800 to select a pertinent skill or set of skills of the available agent to use in selecting which of the available work items the agent will service. For example, when there are a few work items in the queues and the goals are met the selector 220 selects the agent skill in which the agent is most effective. Conversely when there is a high volume of work items in the queues and one or more of the goals are not met, the skill is selected for which the agent is faster compared to his or her peers.

In step 712, the selector 220, based on the selected skill or set of skills selects the work item for assignment to the agent.

In step 716, the assigned work item is delivered to the agent for servicing.

The agent 232 then returns to step 700 to await the next agent becoming available.

Another embodiment of the invention will now be discussed. In this embodiment, the agent 232 selects the appropriate queue 208 (or class of service) for an incoming contact based on the condition of the contact center. In other words, the specific selection criteria (e.g., set of qualifiers) and/or queue selection algorithm used to select the appropriate work item queue 208 for a given contact depends on the current statuses, outcomes, and/or levels of realization of the various contact center goals.

FIG. 5 depicts a goal satisfaction table 500 for use by the agent 232 in this embodiment. The horizontal axis 504 maps the status of each goal against the qualifier (or set of qualifiers) on the vertical axis 508. In other words, when the first, second, .... Nth goals are met the contact is assigned the first qualifier (or first set of qualifiers). As used herein, a qualifier refers to an attribute assigned to a contact that determines, at least in part, to which work item queue 208 the corresponding contact is forwarded (or to which class of service the contact is assigned). Examples of qualifiers include contactor attributes (identity, language, socioeconomic status, value to the contact center, and business history with the enterprise operating the contact center), contact attributes (e.g., communication channel or media), and contactor needs (e.g., type or nature of contact, and purpose of contact). When the first and second goals are met but the Nth goal is unmet, the contact is assigned the second qualifier. When all of the goals are unmet, the contact is assigned the Mth qualifier. For example, when all of the goals (for the contact center and/or gold queue) are being satisfied, a contact from a gold customer is assigned a gold qualifier and sent to the gold queue. When the contact center (and/or the gold queue) is experiencing an extremely high volume of incoming contacts, the contact from the gold customer is assigned a silver qualifier and sent to the silver queue ordinarily reserved for contacts from silver customers.

Figure 6:
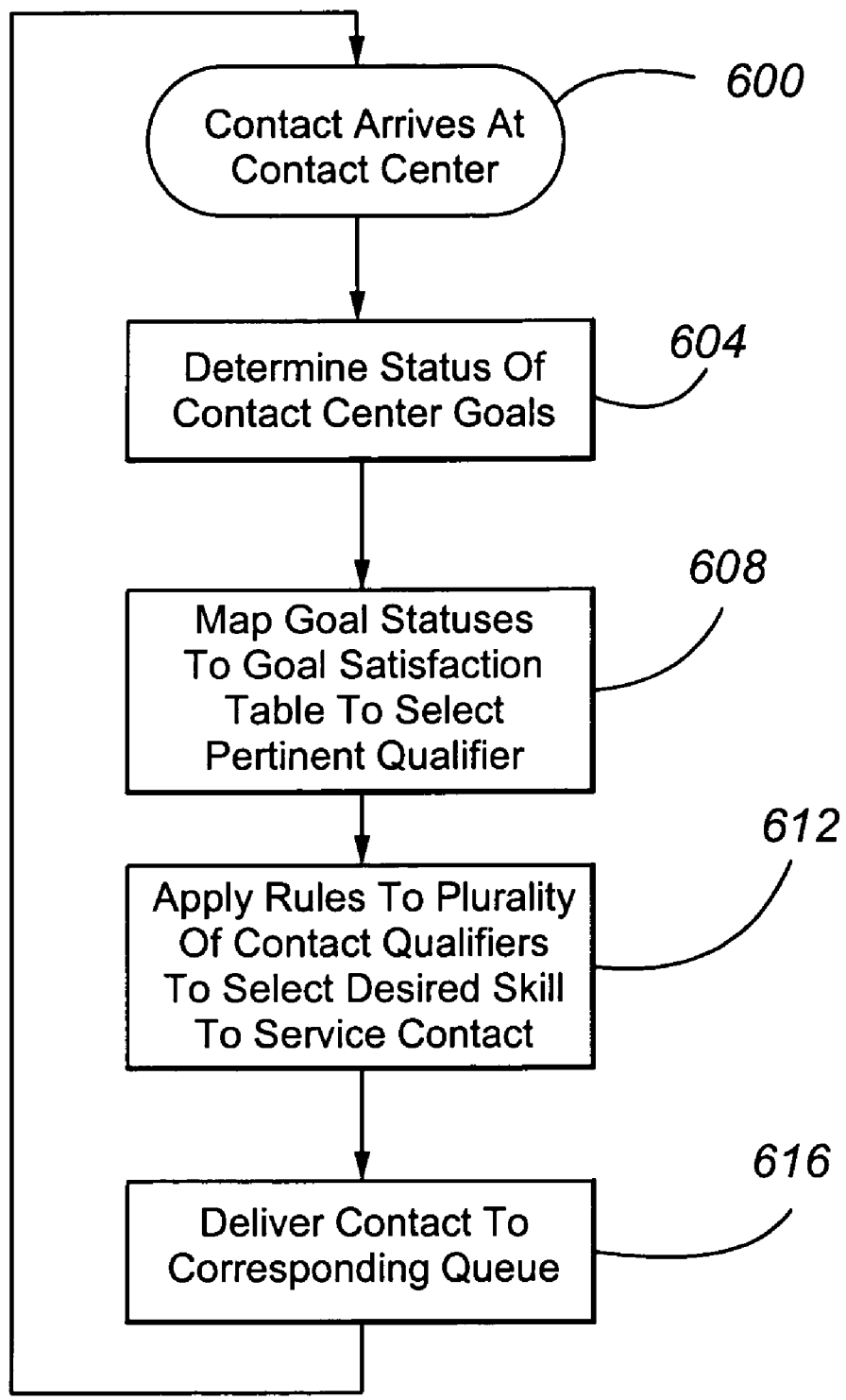
FIG. 6 is a flow chart depicting an operational embodiment of the routing agent according to yet another embodiment of the present invention.

The collective operation of the agent 232 and selector 220 will now be described with reference to FIG. 6.

In step 600, an incoming contact arrives at the contact center.

In step 604, the agent 232 determines the status of the various contact center goals. Typically, the agent 232 obtains this information from CMS 228.

In step 608, the agent 232 maps the statuses of the various goals to the goal satisfaction table 300 to select a pertinent set of qualifier(s) for the contact. The agent 232 then provides the controlling qualifier(s) and/or queue selection algorithm to the work item vector 216.

In step 612, the work item vector 216 applies rules to the set of contact qualifier(s) received from the agent 232 and any other contact qualifier already assigned to the contact to select a desired skill queue 208 to service the contact. The rules may be those currently used in the art or rules configured specifically for the contact center application.

In step 616, the work item vector 216 delivers the contact to the selected queue 208 known techniques. Typically, a pointer to the contact is positioned in the appropriate queue position queue data structure.

The agent 232 then returns to step 600 to await the next incoming contact.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing work items in a contact center, the contact center having a plurality of performance goals, comprising:

selecting, by a contact center server computer, a first work item for routing to a servicing destination, the first work item being selected from a queue of work items having the same skill requirements;

determining, by the contact center server computer, for each of at least two performance goals having different desired service level values, a status of goal realization, the status of goal realization including whether or not a corresponding goal is being met or unmet, wherein the performance goals comprise a plurality of a maximum wait time in a work item queue, a minimum agent staffing level in an agent queue, a minimum revenue realized per serviced work item, a minimum customer satisfaction level, a maximum time for an agent to service a work item, and a minimum number of contacts to be serviced by a set of agents during a selected time period;

mapping, by the contact center server computer, the statuses of goal realization for each of the at least two performance goals against possible agent proficiency aspects in a goal satisfaction table to determine an agent proficiency aspect to use in selecting the servicing destination, the goal satisfaction table comprising an ordered set of N agent proficiency aspects, wherein a first agent proficiency aspect from the N agent proficiency aspects is first in the ordered set and corresponds to a mapping where all of the at least two performance goals are met, and wherein an Nth agent proficiency aspect from the N agent proficiency aspects is last in the ordered set and corresponds to a mapping where none of the at least two performance goals are met, and wherein each agent proficiency aspect between the first agent proficiency aspect and the Nth agent proficiency aspect corresponds to each possible combination of goal realization statuses for the at least two performance goals;

selecting, by the contact center server computer, the servicing destination based, at least in part, on the agent proficiency aspect determined in the mapping step, wherein the first agent proficiency aspect is one of agent effectiveness, agent revenue generating proficiency, agent customer satisfaction level, ability to cross-sell, and personal agent satisfaction, and wherein the Nth agent proficiency aspect is one of agent speed and agent efficiency;

selecting, by contact center server computer, a second work item from the queue of work items, the second work item having the same skill requirements as the first work item; and repeating the determining, mapping, and selecting the servicing destination for the second work item.

2. The method of claim 1, wherein the status of realization of a goal is whether or not the respective goal is met during a selected time period and/or over a selected number of transactions, and wherein the status of goal realization includes whether or not a corresponding goal is being met or unmet and a level to which the corresponding goal is being met or unmet.

3. The method of claim 1, wherein the status of realization of a goal is a measured service level for the respective goal during a selected time period and/or over a selected number of transactions.

4. The method of claim 1, wherein the servicing destination is an agent.

5. The method of claim 4, wherein the selecting step comprises:

selecting, from among a plurality of agents, an agent having a proficiency aspect matching the determined agent proficiency aspect to service the first work item.

6. The method of claim 5, wherein the selected agent is the most proficient in the determined agent proficiency aspect.

7. The method of claim 5, wherein the Nth agent proficiency aspect is the determined agent proficiency aspect only when none of the performance goals are met.

8. The method of claim 1, wherein the ordered set of N agent proficiency aspects are analyzed starting at the first agent proficiency aspect and ending at the Nth agent proficiency aspect.

9. The method of claim 8, wherein, at a first time, a first set of goals has a corresponding first set of statuses, wherein, at a second later time, a second set of goals has a corresponding second set of statuses, wherein the first set of statuses corresponds to the first agent proficiency aspect, wherein the second set of statuses corresponds to a second agent proficiency aspect that is different from the first agent proficiency aspect.

10. A contact center having a plurality of performance goals, comprising:

a processor;

a routing agent operating in a contact center server computer, the routing agent operable to, when a plurality of work items having the same skill requirements are to be routed to a servicing destination:

determine, for each of at least two performance goals having different desired service level values, a status of goal realization, the status of goal realization including whether or not a corresponding goal is being met or unmet, wherein the performance goals comprise a plurality of a maximum wait time in a work item queue, a minimum agent staffing level in an agent queue, a minimum revenue realized per serviced work item, a minimum customer satisfaction level, a maximum time for an agent to service a work item, and a minimum number of contacts to be serviced by a set of agents during a selected time period; and map the statuses of goal realization for each of the at least two performance goals against possible agent proficiency aspects in a goal satisfaction table to determine an agent proficiency aspect to use in selecting the servicing destination, the goal satisfaction table comprising an ordered set of N agent proficiency aspects, wherein a first agent proficiency aspect from the N agent proficiency aspects is first in the ordered set and corresponds to a mapping where all of the at least two performance goals are met, and wherein an Nth agent proficiency aspect from the N agent proficiency aspects is last in the ordered set and corresponds to a mapping where none of the at least two performance goals are met, and wherein each agent proficiency aspect between the first agent proficiency aspect and the Nth agent proficiency aspect corresponds to each possible combination of goal realization statuses for the at least two performance goals;

a destination selector operating in conjunction with the routing agent, the destination selector operable to select the servicing destination based, at least in part, on the agent proficiency aspect determined by the mapping the statuses of goal realization for each of the at least two performance goals against possible agent proficiency aspects in the goal satisfaction table, wherein the first agent proficiency aspect is one of agent effectiveness, agent revenue generating proficiency, agent customer satisfaction level, ability to cross-sell, and personal agent satisfaction, and wherein the Nth agent proficiency aspect is one of agent speed and agent efficiency.

11. The contact center of claim 10, wherein the status of realization of a goal is whether or not the respective goal is met during a selected time period and/or over a selected number of transactions, and wherein the status of goal realization includes whether or not a corresponding goal is being met or unmet and a level to which the corresponding goal is being met or unmet.

12. The contact center of claim 10, wherein the status of realization of a goal is a measured service level for the goal during a selected time period and/or over a selected number of transactions.

13. The contact center of claim 10, wherein the servicing destination is an agent and the destination selector is an agent and work item selector.

14. The contact center of claim 10, wherein the servicing destination is a work item queue and the selector is a work item vector.

15. The contact center of claim 10, wherein, at first time, a first set of goals has a corresponding first set of statuses, wherein, at a second later time, a second set of goals has a corresponding second set of statuses, wherein the first set of statuses corresponds to the first agent proficiency aspect, wherein the second set of statuses corresponds to a second agent proficiency aspect that is different from the first agent proficiency aspect.

16. A computer program product comprising computer-executable instructions stored into a non-transitory compute readable medium which, when executed by a processor of a computer, cause the processor to execute a method for servicing work items in a contact center, the contact center having a plurality of performance goals, the method comprising:
- selecting a first work item for routing to a servicing destination, the first work item being selected from a queue of work items having the same skill requirements;
- determining, for each of at least two performance goals having different desired service level values, a status of goal realization, the status of goal realization including whether or not a corresponding goal is being met or unmet, wherein the performance goals comprise a plurality of a maximum wait time in a work item queue, a minimum agent staffing level in an agent queue, a minimum revenue realized per serviced work item, a minimum customer satisfaction level, a maximum time for an agent to service a work item, and a minimum number of contacts to be serviced by a set of agents during a selected time period;
- mapping the statuses of goal realization for each of the at least two performance goals against possible sets of agent proficiency aspects in a goal satisfaction table to determine an agent proficiency aspect to use in selecting the servicing destination, the goal satisfaction table comprising an ordered set of N agent proficiency aspects, wherein a first agent proficiency aspect from the N agent proficiency aspects is first in the ordered set and corresponds to a mapping where all of the at least two performance goals are met, and wherein an Nth agent proficiency aspect from the N agent proficiency aspects is last in the ordered set and corresponds to a mapping where none of the at least two performance goals are met, and wherein each agent proficiency aspect between the first agent proficiency aspect and the Nth agent proficiency aspect corresponds to each possible combination of goal realization statuses for the at least two performance goals;
- selecting the servicing destination based, at least in part, on the agent proficiency aspect determined in the mapping step, wherein the first agent proficiency aspect is one of agent effectiveness, agent revenue generating proficiency, agent customer satisfaction level, ability to cross-sell, and personal agent satisfaction, and wherein the Nth agent proficiency aspect is one of agent speed and agent efficiency;
- selecting a second work item from the queue of work items, the second work item having the same skill requirements as the first work item; and
- repeating the determining, mapping, and selecting the servicing destination for the second work item.

* * * * *

UNITED STATES PATENT AND TRADEMARK OFFICE
CERTIFICATE OF CORRECTION

| | | |
|---|---|---|
| PATENT NO. | : 8,234,141 B1 | Page 1 of 1 |
| APPLICATION NO. | : 11/064367 | |
| DATED | : July 31, 2012 | |
| INVENTOR(S) | : Andrew D. Flockhart and Robert C. Steiner | |

It is certified that error appears in the above-identified patent and that said Letters Patent is hereby corrected as shown below:

Claim 15, Column 15, line 7, after "at" insert --a--.

Claim 16, Column 15, line 16, delete "computer-" and replace with --computer--.

Claim 16, Column 15, line 17, delete "into a non-transitory compute" and replace with --onto a non-transitory computer--.

Claim 16, Column 15, line 25, delete "the same" and replace with --similar--.

Claim 16, Column 16, line 4, after "mapping" insert --, by the routing agent,--.

Signed and Sealed this

Twentieth Day of November, 2012

David J. Kappos
*Director of the United States Patent and Trademark Office*